Figure 1:
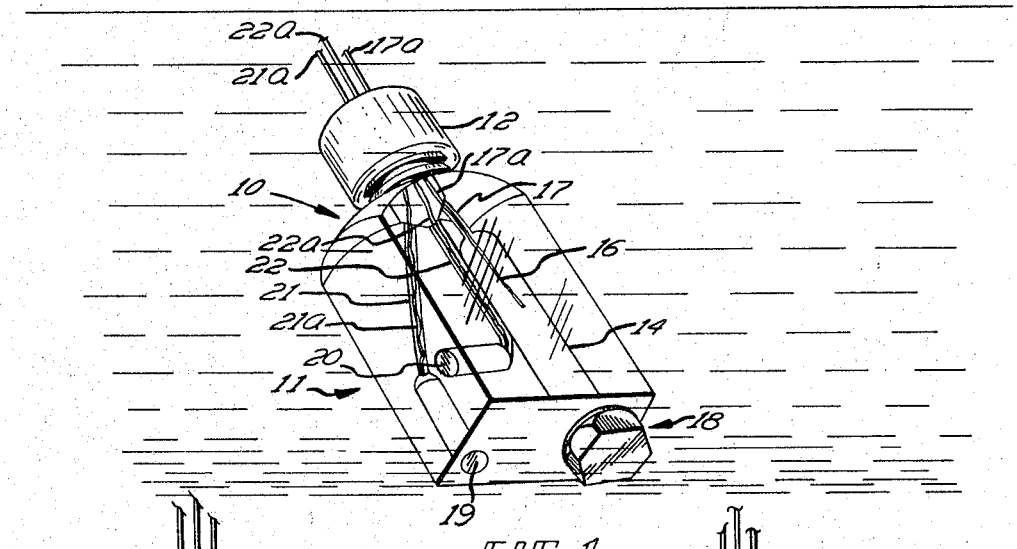

Jan. 17, 1967  J. R. LUCK  3,298,944
ELECTROCHEMICAL SENSORS
Filed Aug. 22, 1962

INVENTOR.
JAMES R. LUCK
BY Robert O. Vidas
ATTORNEY

United States Patent Office 3,298,944
Patented Jan. 17, 1967

3,298,944
ELECTROCHEMICAL SENSORS
James R. Luck, Minneapolis, Minn., assignor to Honeywell Inc., a corporation of Delaware
Filed Aug. 22, 1962, Ser. No. 218,668
12 Claims. (Cl. 204—195)

This invention relates broadly to electrochemical apparatus for measuring ionic concentrations and has particular application as a sensor for the determination of the pH and chlorine content of aqueous solutions such as those normally found in swimming pools, rivers and the like.

Specifically, the present invention is directed to a preferred embodiment which combines indicator electrodes, reference electrode and bridge in a compact structure suitable for everyday commercial or domestic use as opposed to the more complicated and delicate laboratory type devices shown in the prior art.

In addition to the simple, rugged, composite structure of the device, there are several other unique features which add to its serviceability, long-term life, accuracy and reproducibility.

A first such feature is the incorporation of a uniquely prepared and mounted antimony indicator electrode which makes it possible to obtain a reproducible, uniform E.M.F. response therefrom. This has not been possible with antimony electrodes known to date in the art.

A second such feature is of the present invention is a unique "electrolytic bridge" and related structure. Semipermeable materials or the more selective semipermeable materials commonly termed ion exchange materials are utilized in the electrochemical art to establish ionic conductivity between solutions while inhibiting intermixing therebetween. The term "electrolytic bridge material" as used throughout the following specification will be understood to include both aforementioned types. The following chart discloses several typical examples of electrolytic bridge materials which can be utliized in accordance with the present invention.

greatly advances the art as shown by the preferred embodiment described herein.

The novel electrolytic bridge of the present invention has many advantages over those of the prior art, among which are:

(1) It inhibits leaks almost completely, allowing only ionic transfer.
(2) The electrolytic bridge material is protected from injury.
(3) The design allows for certain sealing.
(4) Replacement of the electrolytic bridge material is accomplished with relative ease.
(5) The design of the electrolytic bridge structure allows the device to be mounted in any position as opposed to the prior art devices which were limited to operation in a vertical position.

It is an object of the present invention to combine a plurality of indicator electrodes, a reference electrode unit and an electrolytic bridge within a single structure.

It is another object of the present invention to provide a device which is operable in any position or angle from the vertical, including an upside down position.

A further object of the invention and one of its embodiments is to provide a combined device into which a novel electrolytic bridge assembly is incorporated.

Another object of the invention is to provide a novel electrolytic bridge for use in half-cells or the like, which is highly leak resistant and protected from accidental penetration.

A further object of the invention is to provide a combination electrochemical device utilizing a unique antimony electrode assembly for pH measurement.

Another object of the invention is to provide a unique antimony electrode assembly for use in electrochemical apparatus generally, which is extremely reproducible and achieves very uniform responses.

An additional object of the invention is to provide a combination pH and chlorine sensor for use in swimming pools, rivers and the like, which incorporates a novel elec-

| Type | Tradename | Chemical Description | Manufacturer |
|---|---|---|---|
| Semipermeable or non-selective | {NALCO D-20<br>{NALCO D-30 | }Porous synthetic vinyl resin polymers. | National Aluminate Corporation. |
| Do | MIPOR | Polyvinyl chloride polymer | E.S.B. Reeves Corporation. |
| Ion Exchange (Cation type) | NALFILM 1 | Sulfonated polystrene polymer | National Aluminate Corporation. |
| Do | TNO C-60 | do | American Machine & Foundry. |
| Ion Exchange (Anion type) | NALFILM 2 | Polystyrene polymer of the quaternary ammonium type. | National Aluminate Corporation. |
| Do | TNO A-60 | do | American Machine & Foundry. |

A typical example of a device capable of utilizing such materials in this manner is the well-known concentration cell, which contains a standard solution of known concentration. The E.M.F. produced by an electrode immersed in the standard solution is measured and compared to the E.M.F. produced by a similar electrode immersed in a solution of unknown concentration. To electrically balance such a cell, it is necessary to establish ionic conductivity between the two solutions. Thus, the use of the above-mentioned materials to establish ionic junctions or ionic conductivity between solutions has become widely known in the art and they are commonly termed "electrolytic bridges" or "electrolytic bridge materials." These terms will be used in that connection throughout the following specification.

It is easily seen that the electrolytic bridge forms an important portion of all such electrochemical devices since it is responsible in large part for the accuracy and durability which can be expected from them. In that regard, the electrolytic bridge of the present invention trolytic bridge and antimony electrode arrangement into a unique design suitable for commercial and domestic use.

Further objects and advantages of the present invention are brought out in the drawings and in the explanation which follows.

Figures 2, 3:
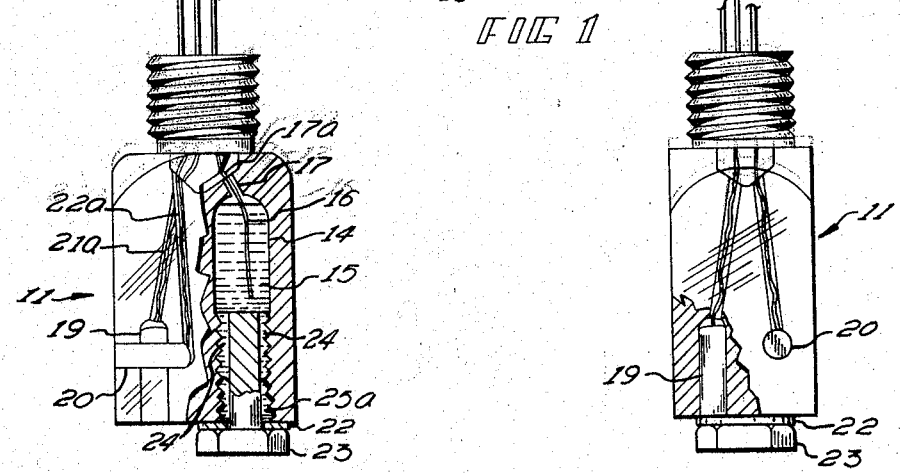
Figure 4:
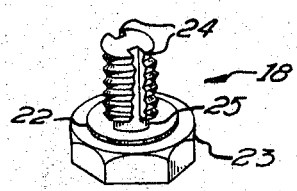

Referring to the drawings:

FIGURE 1 is a perspective view of the combination pH and chlorine sensor in accordance with the invention;

FIGURE 2 similarly represents a full face view of the device of FIGURE 1 with portions removed for purpose of clarity;

FIGURE 3 similarly represents a side view of the device of FIGURE 1 with portions removed for purpose of clarity;

FIGURE 4 represents the novel electrolytic bridge and mounting means removed from the device shown in FIGURES 1, 2, and 3.

Referring to FIGURE 1, a preferred embodiment of the present invention is shown and generally designated as 10. Body 11 is formed from transparent Lucite, although any non-conductive material which is impervious to and not attacked by the solution may be used. Cap 12 closes the upper portion of body 11 to seal the interior of the device from the solution into which it is immersed. Cap 12 also allows for the exit of the electrical leads from the device, which are associated with external circuitry such as a voltmenter or the like. 14 is a reference electrode or half-cell containing a solution of potassium chloride 15 and a silver-silver chloride electrode 16, the operation of which is well known in the art. Channel 17 is provided in body 11 to allow passage for a lead 17a from the silver-silver chloride electrode 16 to the external circuitry associated with the device.

The novel electrolytic bridge assembly 18 of the invention is shown in closing relationship with the opening formed by half-cell 14. Electrolytic bridge assembly 18 utilizes an electrolytic bridge material of the type previously described to establish an ionic junction between the standard potassium chloride solution 15 and the solution into which the device is adapted to be immersed and will be further described in connection with FIGURES 2 through 4.

Two indicator electrodes 19 and 20 are shown mounted in body 11 in such a way as to expose portions of the surfaces thereof to the solution in which the device is adapted to be immersed. Channels 21 and 22 are provided in body 11 for leads 21a and 22a from electrodes 19 and 20 respectively, by which connection is made into the external circuitry of the device.

Electrode 19 is an antimony electrode incorporating novel features of the present invention and will be further described in connection with FIGURES 2 through 4. Antimony electrode 19 in cooperation with reference half-cell 14 is capable of measuring the pH of the solution into which the device is adapted to be immersed.

Electrode 20 is a platinum electrode as commonly used in the prior art. Platinum electrode 20 in cooperation with reference half-cell 14 is capable of measuring chlorine ion concentration of the solution into which the device is immersed. Other electrode materials may be used in place of the platinum electrode. The reference half-cell may be other than the silver-silver chloride type. These will be obvious to those skilled in the art.

It can be seen from the above general description of the preferred embodiment of the present invention that by alternately connecting electrode 19 to reference half-cell 14 and electrode 20 to reference half-cell 14 through a voltmeter or the like, measurements of pH and chlorine ion concentration of any solution under investigation can be obtained.

As stated above, simipermeable and ion exchange materials are widely used in the electrochemical art as electrolytic bridges to establish liquid junction between indicator and reference half-cells. Generally, such a bridge fulfills two major functions:

(1) It establishes ionic conductivity between the solutions, thus completing the electrical circuit of the cell.
(2) It inhibits intermixing of the two solutions, thus maintaining accurate measurements.

In the prior art, electrolytic bridges have taken the form of a membrane and have been typically mounted in the following manner. The membrane is positioned over an opening and held in place by a screw cap or the like with opposite surfaces of a large central portion of the membrane exposed to the solutions of the reference cell and the liquid in which the cell is immersed. Such mounting techniques have several drawbacks, e.g.:

(1) With a major portion of the membrane surface exposed, the bridge is dangerously prone to penetration or blocking by foreign objects.
(2) Such bridges have a tendency to leak and allow intermixing of the two solutions after sustained use either through the large exposed surface of the membrane or through the area at which the holding means and the membrane contact each other.
(3) Since it is extremely difficult to place such an assembly on a device while keeping the cavity completely full of the standard solution or without introducing air bubbles, it becomes necessary to operate the device in the vertical position only in order to maintain liquid contact with the membrane.

Referring now to FIGURES 2 through 4, the mounting of the electrolytic bridge of the present invention is discussed in order to show how it overcomes the above objections to the electrolytic membrane bridges of the prior art.

The electrolytic bridge assmebly of the present invention is generally designated as 18 and consists of plug means 23 and bridge material in the form of a washer 22 mounted thereon. Plug 23 in the preferred embodiment takes the form of a threaded bolt containing two slots placed peripherally as shown at 24. Slots 24 communicate with the electrolyte 15 within half-cell 14 and at the opposite ends thereof with an indented portion 25 of plug 23 which forms a chamber 25a when plug 23 is inserted into the cavity of half-cell 14.

When plug 23 is inserted into the cavity of half-cell 14 and threadedly engaged therewith as shown in FIGURES 2 and 3, washer 22 is held tightly between body 11 and the head portion of plug 23. Only the edges of washer 22 are exposed to the solution into which the device is immersed. Electrolyte 15 contacts an interior portion of washer 22 by flowing through slot 24 and into area 25a near the head of the plug 23. Hence, it can easily be seen that the electrolytic bridge is virtually punctureproof in that only an edge of washer 22 is exteriorally exposed. In addition, the plug 23 may be tightened down, thus bringing a heavy load to bear on washer 22 since it is held between the head portion of plug 23 and a portion of body 11. In this way, a tight liquid-impervious seal is formed. In actual practice it has been established that ionic transfer will take place through washer 22 under the most extreme loading conditions. For example, plug 23 has been tightened to such an extreme that the head portion was damaged. Despite this, the electrolytic bridge material functioned satisfactorily in establishing the ionic junction and the electrolytic bridge was definitely liquid impervious. Thus it can easily be seen that the novel electrolytic bridge of the present invention allows extremely tight liquid-impervious seals while establishing the required ionic conductivity between solutions.

In accordance with the present invention, the cavity of reference half-cell 14 can be completely filled with the standard solution and maintained in that condition and the device will then be capable of operating in any position, e.g., upside down, since the standard solution will maintain contact with the bridge material, not being able to flow away from it. By utilizing threaded plug 23 to seal the cavity of reference half-cell 14, it becomes possible to insert electrolytic bridge assembly 18 into the cavity while maintaining it in the full condition. In other words, when plug 23 is threaded into the cavity, the only liquid lost is that which is displaced by the threads of the plug and air bubbles are not introduced into the cavity. When insertion is complete, the cavity is still completely full of standard solution and the device will operate in any desired position since the standard solution cannot flow away from the electrolytic bridge material.

Reference is now made to the novel antimony electrode portion of the preferred embodiment disclosed by the present invention. Antimony electrodes have been used in the prior art for pH measurement and are widely known to have particular application in solutions having high pH. Heretofore the glass electrode has been widely used for pH measurements since it proved to be the most accurate device available. But, the glass electrode has the disadvantage of being extremely fragile, thus requiring careful handling. Since the antimony electrode is rugged and durable, it is a logical replacement for the more fragile glass electrode. But the antimony electrode has had a major drawback in that it has not been reproducible or capable of yielding uniform measurements. That is, heretofore the pH measurements obtained from the antimony have varied not only from electrode to electrode, but between different areas on a single electrode. The present invention makes it possible to obtain antimony electrodes which are consistently reproducible and achieve uniform responses within five millivolts. Thus, the present invention makes it possible to replace the glass electrode with a more durable one of comparable accuracy.

It has been found that antimony used in previous devices as an electrode material had a difference in crystal orientation in the base of the electrode as compared to the middle portion thereof. From these metallurgical studies, it was concluded that the difference in E.M.F. obtained between identically prepared antimony samples and between various portions thereof was strongly due to crystalline structure. It was also found that very reproducible and uniform electrode responses could be achieved by choosing the same portion of an antimony slug each time for the measuring surface of the electrode. Essentially, it was concluded that to achieve reproducible antimony electrodes with uniform E.M.F. responses, it is necessary to:

(1) Obtain a uniform crystalline orientation on a specific surface of the antimony slug.
(2) Mount the antimony slug so as to present only that surface to the solution.

The above-mentioned metallurgical studies also considered the effect of impurities in the antimony electrode. As is well known in the art, impurities affect the potential of the antimony electrode. It was determined experimentally that 99.999% pure antimony acted in the same manner as reagent grade antimony which contains .04%/wt. As, .02%/wt. Cu, .03%/wt. Fe, and .02%/wt. Pb. That is, small quantities of impurity in the antimony appear to have little effect. But larger quantities of impurities, such as copper, tin, zinc, barium, and lead, in the range of about 1% by wt. do have a detrimental effect on the uniformity and reproducibility of the potential developed by the antimony electrode. This is believed to be caused in part by impurity formed nucleation sites which result in a spherical crystal structure. On the other hand, impurities such as cadmium, iron, aluminum, nickel, silver and sulfur did not affect the potential developed by the antimony electrode as much as the above-mentioned impurities.

The well-known centrifugal chill-casting technique has been found to be particularly satisfactory in preparing the desired uniform crystalline orientation in the antimony slug. In preparing antimony for use in the present invention, a cold round graphite mold was rotated in a nitrogen atmosphere. The mold is cut out in such a way that the resulting casting looks like the spokes and hub of a wheel. The molten antimony is poured into the hub about which the mold rotates. The spokes are used for electrodes. The crystal orientation of a single spoke shows a uniformly oriented radial structure of columnar crystals in cross-section due to the chill-casting.

Thus if a spoke is used as an electrode 19 and mounted as shown in FIGURES 1 through 3 with only the end surface exposed, the radial-like lateral surfaces of the antimony crystals are arranged to contact the solution into which the device is immersed and very reproducible and uniform electrodes are obtained.

By following the teachings of the present invention, it can be seen that electrochemical devices utilizing the above described combinations can be made and used which are rugged, simple, accurate and show many advantages over those of the prior art. It is obvious that various portions of the subject invention are capable of being utilized in electrochemical devices other than the combination pH and chlorine indicator disclosed as the preferred embodiment herein.

What is claimed is:

1. An electrode assembly comprising in combination: a first body of chemically inert, electrically nonconductive material adapted to be immersed in a test solution, said first body defining a chamber with an opening in a wall of said first body leading into said chamber; a sealing surface on said first body encompassing said opening; an electrolyte solution in said chamber; a solid body of electrolytic bridge material having first and second oppositely disposed sealing surfaces and positioned so as to have said first sealing surface contacting said sealing surface on said first body; a second body of chemically inert, electrically nonconductive material contacting said second sealing surface; fastening means acting between said first and second bodies to maintain intimate contact between said sealing surfaces and hold said body of bridge material in said position with only a peripheral portion exposed to the test solution and an interior portion thereof exposed to said electrolyte, and an electrode disposed within said first body and contacting said electrolyte.

2. An electrode assembly comprising in combination: a first body of chemically inert, electrically nonconductive material adapted to be immersed in a test solution, said first body defining a chamber with an opening in a wall of said first body leading into said chamber; a sealing surface on said first body encompassing said opening; an electrolyte solution in said chamber; a solid body of electrolytic bridge material having first and second oppositely disposed substantially parallel sealing surfaces and positioned so as to have said first sealing surface contacting said sealing surface on said first body; a second body of chemically inert, electrically nonconductive material contacting said second sealing surface; fastening means acting between said first and second bodies to maintain intimate contact between said sealing surfaces and hold said body of bridge material in said position with only a peripheral portion of said bridge material exposed to the test solution and an interior portion thereof exposed to said electrolyte, and an electrode disposed within said first body and contacting said electrolyte.

3. An electrode assembly comprising in combination: a first body of chemically inert, electrically nonconductive material adapted to be immersed in a test solution, said first body defining a chamber with an opening in a wall of said first body leading into said chamber; a sealing surface on said first body encompassing said opening; an electrolyte in said chamber; a solid body of electrolytic bridge material having first and second oppositely disposed sealing surfaces and positioned so as to have said first sealing surface contacting said sealing surface on said first body; a second body of chemically inert, electrically nonconductive material contacting said second sealing surface; fastening means extending from said second body through said body of bridge material and said opening to connect with said first body to maintain intimate contact between said sealing surfaces and hold said body of bridge material in said position with only a peripheral portion of said bridge material exposed to the test solution and an interior portion thereof exposed to said electrolyte, and an electrode disposed within said first body and contacting said electrolyte.

4. An electrode assembly comprising in combination: a first body of chemically inert, electrically nonconductive material adapted to be immersed in a test solution, said first body defining a chamber, a threaded opening in a wall of said first body leading into said chamber; a sealing surface on said first body encompassing said opening; an electrolyte solution in said chamber; a relatively thin annular body of electrolytic bridge material having first and second oppositely disposed sealing surfaces and positioned so as to have said first sealing surface contacting said sealing surface on said first body; a second body of chemically inert, electrically nonconductive material including an outer head member contacting said second sealing surface of said bridge material to allow only an edge of said bridge material to be exposed to the test solution, and an inner threaded member extending through said bridge material and engaging said threaded opening in said first body to maintain intimate contact between said sealing surfaces, said inner member having at least one peripheral groove substantially parallel to the longitudinal axis thereof leading to an annular recessed portion between said inner and outer members for establishing contact between said body of bridge material and said electrolyte, and an electrode disposed within said first body and contacting said electrolyte.

5. A self-contained electrochemical cell adapted to be immersed in a test solution for measuring ionic constituents thereof comprising in combination: a first body of chemically inert, electrically nonconductive material defining a chamber with an opening in a wall of said first body leading into said chamber; a sealing surface on said first body encompassing said opening; an electrolyte solution in said chamber; a body of electrolytic bridge material having first and second oppositely disposed sealing surfaces and positioned so as to have said first sealing surface contacting said sealing surface on said first body; a second body of chemically inert, electrically nonconductive material contacting said second sealing surface; fastening means acting between said first and second bodies to maintain intimate contact between said sealing surfaces for holding said body of bridge material in said position with only a peripheral portion of said bridge material exposed to the test solution and an interior portion thereof exposed to said electrolyte; an indicator electrode mounted in a wall of said first body including a metal member with at least a portion of a surface thereof exposed to the test solution; means for electrically contacting said indicator electrode, and an electrode disposed within said first body and contacting said electrolyte solution.

6. A self-contained electrochemical cell to be immersed in a test solution for measuring the pH and chlorine concentration thereof, which combines reference electrode, indicator electrodes and electrolytic bridge in a single structure, comprising: a first body of chemically inert, electrically nonconductive material adapted to be immersed in the test solution, said first body defining a chamber with an opening in a wall of said first body leading into said chamber; a sealing surface on said first body encompassing said opening; an electrolyte solution in said chamber; a body of electrolytic bridge material having first and second oppositely disposed sealing surfaces and positioned so as to have said first sealing surface contacting said sealing surface on said first body; a second body of chemically inert, electrically nonconductive material contacting said second sealing surface; fastening means acting between said first and second bodies to maintain intimate contact between said sealing surfaces and hold said body of bridge material in said position with only a peripheral portion thereof exposed to the test solution and an interior portion thereof exposed to said electrolyte solution; a first indicator electrode including an antimony member mounted flush in a wall of said first body with a surface thereof adapted to contact the test solution; means for electrically contacting said first indicator electrode; a second indicator electrode including a platinum member in a wall of said first body with a portion thereof adapted to contact the test solution; means for electrically contacting said second indicator electrode, and a reference electrode disposed within said first body and contacting said electrolyte solution.

7. An electrode assembly comprising in combination: a first body of chemically inert, electrically nonconductive material adapted to be immersed in a test solution, said first body defining a chamber with an opening in a wall of said first body leading into said chamber; an electrolyte solution in said chamber; a solid body of electrolytic bridge material; a second body of inert, electrically nonconductive material closing said opening; fastening means holding said body of bridge material between said first and second bodies with only a peripheral portion exposed to the test solution and an interior portion exposed to said electrolyte solution, and an electrode disposed within said first body and contacting said electrolyte solution.

8. In an antimony electrode adapted to be immersed in a solution, the improvement comprising: a mounting means of chemically inert, electrically nonconductive material, said mounting means including an antimony member confined therein with a portion of a cross-sectional surface only of said antimony member adapted to be exposed to the solution, said surface being characterized in that it is formed of radially arranged columnar crystals.

9. A self-contained electrochemical cell adapted to be immersed in a test solution for measuring ionic constituents thereof comprising in combination: a first body of chemically inert, electrically nonconductive material defining a chamber with an opening in a wall of said first body leading into said chamber; a sealing surface on said first body encompassing said opening; an electrolyte solution in said chamber; a body of electrolytic bridge material having first and second oppositely disposed sealing surfaces and positioned so as to have said first sealing surface contacting said sealing surface on said first body; a second body of chemically inert, electrically nonconductive material contacting said second sealing surface; fastening means acting between said first and second bodies to maintain intimate contact between said sealing surfaces and hold said body of bridge material in said position with only a peripheral portion of said bridge material exposed to the test solution and an interior portion thereof exposed to said electrolyte; an indicator electrode including an antimony member mounted flush in a wall of said first body, a portion of a cross-sectional surface only of said antimony member adapted to contact the test solution, said antimony member being further characterized in that said surface is formed of radially arranged columnar antimony crystals; means for electrically contacting said indicator electrode, and an electrode disposed within said first body and contacting said electrolyte solution.

10. A self-contained electrochemical cell adapted to be immersed in a test solution for measuring the pH and chlorine ion concentration thereof, said cell combining reference electrode, indicator electrodes and electrolytic bridge in a single structure comprising: a chemically inert, electrically nonconductive container defining a chamber, said container having an opening through a wall thereof leading into said chamber; reference electrode means in said chamber; an electrolytic bridge mounted in said opening for establishing an ionic junction between the test solution and said reference electrode means; a first indicator electrode including an antimony member mounted in a wall of said container with a portion thereof disposed to contact the test solution; a second indicator electrode including a platinum member mounted in a wall of said container with a portion thereof disposed to contact the test solution, and means for electrically contacting said indicator electrodes.

11. A self-contained electrochemical cell to be immersed in a test solution for measuring the pH and chlorine concentration thereof, which combines reference electrode, indicator electrodes and electrolytic bridge in a single structure comprising: a first body of chemically inert, electrically nonconductive material adapted to be immersed in the test solution, said first body defining a chamber with an opening in a wall of said first body leading into said chamber; a sealing surface on said first body encompassing said opening; an electrolyte solution in said chamber; a body of electrolytic bridge material having first and second oppositely disposed sealing surfaces and positioned so as to have said first sealing surface contacting said sealing surface on said first body; a second body of chemically inert, electrically nonconductive material contacting said second sealing surface; fastening means extending from said second body through said body of bridge material and said opening to connect with said first body and hold said body of bridge material in said position with only a peripheral portion thereof exposed to the test solution and an interior portion thereof exposed to said electrolyte solution; a first indicator electrode including an antimony member confined in said wall of said first body with a portion of a single surface only of said antimony member adapted to be exposed to the test solution, said surface being characterized in that it is formed of radially arranged columnar antimony crystals; means for electrically contacting said first indicator electrode; a second indicator electrode mounted in said wall of said first body with a portion thereof adapted to contact the test solution; means for electrically contacting said second indicator electrode, and a reference electrode disposed within said first body and contacting said electrolyte solution.

12. A self-contained electrochemical cell to be immersed in a test solution for measuring the pH and chlorine concentration thereof, which combines reference electrode, indicator electrodes and electrolytic bridge in a single structure comprising: a first body of chemically inert, electrically nonconductive material adapted to be immersed in the test solution, said first body defining a chamber with a threaded opening in a wall of said first body leading into said chamber; a sealing surface on said first body encompassing said opening; an electrolyte solution in said chamber; a relatively thin annular body of bridge material having first and second oppositely disposed sealing surfaces and positioned so as to have said first sealing surface contacting said sealing surface on said first body; a second body of chemically inert, electrically nonconductive material including an outer head member contacting said second sealing surface of said body of bridge material to allow only an edge of said bridge material to be exposed between said first body and said outer head member to the test solution, and an inner threaded member extending through said bridge material and engaging said threaded opening in said first body to maintain intimate contact between said sealing surfaces, said inner member having at least one peripheral groove substantially parallel to the longitudinal axis thereof leading to an annular recessed portion between said inner and outer members for establishing contact between said body of bridge material and said electrolyte solution; a first indicator electrode including an antimony member mounted flush in said wall of said first body with a portion of a cross-sectional surface only of said antimony member adapted to contact the test solution, said surface being characterized in that it is formed of radially arranged columnar antimony crystals; means for electrically contacting said first indicator electrode; a second indicator electrode including a platinum member mounted in said wall of said first body and adapted to contact the test solution; means for electrically contacting said second indicator electrode, and a reference electrode disposed within said first body and contacting said electrolyte solution.

References Cited by the Examiner

UNITED STATES PATENTS

| | | | |
|---|---|---|---|
| Re 24,222 | 9/1956 | Patnode et al. | 204—195 |
| 2,168,867 | 8/1939 | George | 204—195 |
| 2,192,123 | 2/1940 | Bennett | 204—195 |
| 2,288,180 | 6/1942 | Brengman et al. | 204—195 |
| 2,370,871 | 3/1945 | Marks | 204—195 |
| 2,387,727 | 10/1945 | Godshalk | 204—195 |
| 2,886,771 | 5/1959 | Vincent | 204—195 |

OTHER REFERENCES

Ives, "Reference Electrodes," 1961, pages 598 and 599.

JOHN H. MACK, *Primary Examiner.*

MURRAY TILLMAN, WINSTON A. DOUGLAS,
*Examiners.*

T. H. TUNG, *Assistant Examiner.*